United States Patent [19]
Hamlin

[11] Patent Number: 5,645,262
[45] Date of Patent: Jul. 8, 1997

[54] PORTABLE CD MOUNT FOR OFF ROAD VEHICLES

[76] Inventor: Matthew Glen Hamlin, P.O. Box 736, Flora Vista, N.M. 87415

[21] Appl. No.: 551,962
[22] Filed: Nov. 2, 1995
[51] Int. Cl.⁶ .................................................. F16M 13/00
[52] U.S. Cl. ...................................... 248/581; 248/610
[58] Field of Search ........................... 248/581, 610, 248/560, 638

[56] References Cited

U.S. PATENT DOCUMENTS

| | | | |
|---|---|---|---|
| 1,842,198 | 1/1932 | Price | 248/581 |
| 2,474,042 | 6/1949 | Egle, Jr. | 248/610 |
| 4,553,231 | 11/1985 | d'Arc | 369/263 |
| 4,796,849 | 1/1989 | Fouassier | 248/619 |
| 4,922,478 | 5/1990 | Verhagen | 369/247 |
| 5,359,587 | 10/1994 | Uehara | 369/75.1 |
| 5,463,527 | 10/1995 | Hager et al. | 248/581 |
| 5,478,079 | 12/1995 | Liberatore et al. | 273/186.2 |
| 5,522,619 | 6/1996 | Collins | 280/806 |

Primary Examiner—Leslie A. Braun
Assistant Examiner—Willie Berry, Jr.
Attorney, Agent, or Firm—Patent & Trademark Services; Joseph H. McGlynn

[57] ABSTRACT

A compact disc player mounting system to be used in a vehicle. The mounting system comprises an outer case which is secured to the vehicle. An inner case is placed within the outer case and is suspended within the outer case by resilient mounts which are resilient in both a horizontal and vertical direction. The compact disc player is placed within the inner case and is, therefore, isolated from all adverse, exterior conditions.

4 Claims, 1 Drawing Sheet 5,645,262

PORTABLE CD MOUNT FOR OFF ROAD VEHICLES

BACKGROUND OF THE INVENTION

This invention relates in general to mounts for compact disc players and in particular to mounts for compact disc players to be used in off road vehicles.

DESCRIPTION OF THE PRIOR ART

In the prior art various types of mounts for compact disc players have been proposed. For example, U.S. Pat. No. 4,533,231 discloses a suspension system which provides a motion damping mounting for carrying a record playback machine comprising a plurality of elastic rings which are fastened between the machine and its support. U.S. Pat. No. 4,796,849 discloses an anti-vibration device for attaching a compact disc to an automobile comprising an anti-vibration layer between the compact disc player and its mounting surface. U.S. Pat. No. 4,922,478 discloses a vibration damping support frame consisting of a plurality of spring biased pivot points. U.S. Pat. No. 5,359,587 discloses an electronic equipment housing vibration damping support system.

With the popularity of compact disc players more and more players are being used in automobiles. The use of such devices in a vehicle which may turn sharply, accelerate, decelerate, or be subjected to sudden jars or impacts places high demands on these types of machines. Because of the small widths of the tracks used on compact discs, the laser scanners must be precisely guided to maintain alignment with the tracks as the discs are rotated at high speeds. The demands on such a machine are severe when they are used in a normal automobile, and the demands are much higher when the compact disc players are used in so called off-road or 4×4 vehicles.

SUMMARY OF THE INVENTION

The present invention is designed to mount a compact disc player in an off-road or 4×4 vehicle. It comprises an outer case which is secured to the vehicle by a steel mount. An inner case is placed within the outer case and is suspended within the outer case by resilient mounts which are resilient in both a horizontal and vertical direction. The compact disc player is placed within the inner case and is, therefore, isolated from all adverse, exterior conditions.

It is an object of the present invention to provide a mounting system for machines such as compact disc players which can be used in vehicles.

It is an object of the present invention to provide a mounting system for machines such as compact disc players which provide for damping the motion of the vehicles before it can reach and affect the compact disc player.

It is an object of the present invention to provide a mounting system for machines such as compact disc players which can be used in off-road or 4×4 vehicles.

These and other objects and advantages of the present invention will be fully apparent from the following description, when taken in connection with the annexed drawings.

DESCRIPTION OF THE PREFERRED EMBODIMENT

Figure 1:
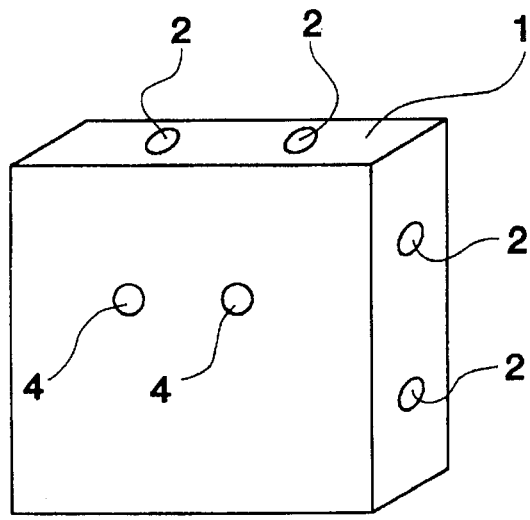
FIG. 1 is a perspective view of the outer casing.
Figure 2:
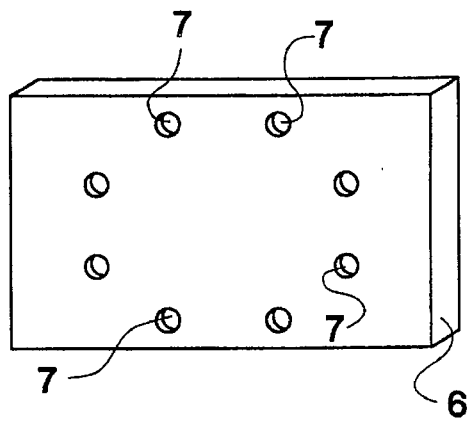
FIG. 2 is a perspective view of the inner plate.

Referring now to the drawings in greater detail, FIG. 1 shows the outer casing 1 having eight apertures 2 (only four apertures are shown in FIG. 1) in the perimeter of the outer casing. The bottom of the outer casing will be secured thereto by any conventional means including, but not limited to screws (not shown) extending through apertures 4.

Figure 4:
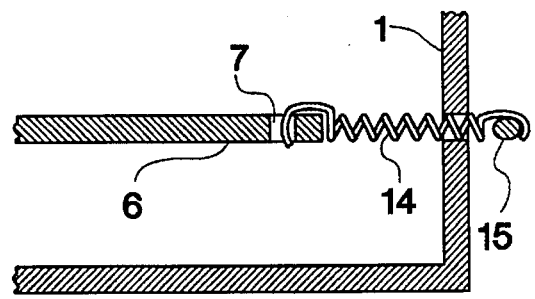
FIG. 4 is a view of the inner plate mounted to the outer casing of FIG. 1.
Figure 5:
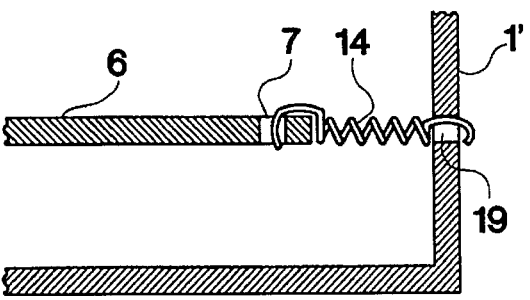
FIG. 5 is is a view of the inner plate mounted to the outer casing of FIG. 3.

Connected inside outer casing 1 is an inner plate 6, which has eight apertures 7 equally spaced around the perimeter of the plate 6. Inner plate 6 is resiliently mounted to outer casing 1 as shown in FIGS. 4 or 5 by means of a coiled spring 14 which has one end connected to an aperture 7 in the plate 6. The spring then extends through one of the apertures 2 in the sides of the outer casing 1 of FIG. 1. On the outside of the outer casing the spring 14 is secured to a bar 15. There will be a bar 15 for each side of the outer casing, and two springs 14 will be secured to each bar 15. This arrangement will produce a completely balanced and free floating inner plate 6 with respect to the outer casing 1. since there are two springs 14 connecting each side of the inner plate to each side of the outer casing the plate will be resiliently mounted in a vertical and horizontal direction.

Figure 3:
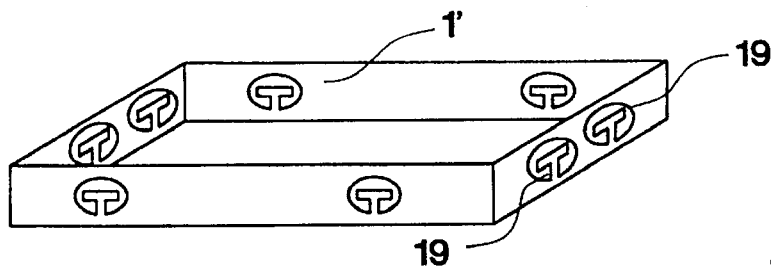
FIG. 3 is a view of another embodiment of the outer case.

The embodiment in FIGS. 3 and 5 is similar to the FIG. 4 embodiment except that the apertures in the sides of the outer case are different and the bar 15 is not used. The apertures 19 in the sides of the outer case 1' are T-shaped and an end of the spring 14 is inserted through the aperture and secured to the side of the case 1' as shown in FIG. 5.

Figure 6:
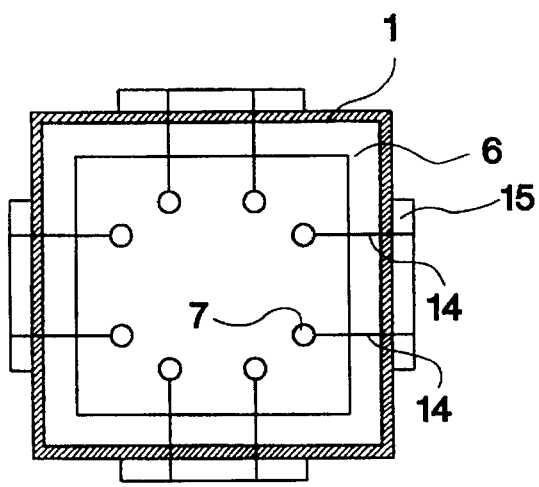
FIG. 6 is a plan view showing the inner plate mounted to the outer casing of FIG. 1.

FIG. 6 schematically shows the inner plate 6 mounted to the outer casing 1 by means of eight coil springs 14 and four rods 15. Once the compact disc player is attached to the inner plate 6 it will be isolated, by means of the resilient mounting of the springs 14 from any motion of the vehicle that might reach outer casing 1. The embodiment shown in FIGS. 3 and 5 is similar and will operate in the same manner.

The CD player can be mounted to the inner plate 6 by any conventional means such as by Velcro strips which have adhesive backs.

Although the compact disc player mounting system and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A mounting assembly for mounting an audio play back machine in a vehicle comprising:

an outer casing having a bottom and four sides, means on said bottom for mounting said outer casing to a vehicle, a plurality of first apertures in said sides of said outer casing, an inner plate having a bottom surface, a top surface and four sides, a plurality of second apertures extending through said top and bottom surfaces of said inner plate, resilient means attached to each of said second apertures, each of said resilient means extending through one of said first apertures in said sides of said outer casing, means on an outside of said outer casing for anchoring said resilient means, said means for anchoring said resilient means comprising an abutment bar which is separate from said outer casing, and larger than said apertures in said sides of said outer casing, an end of said resilient means extending through said apertures in said sides of said outer casing and engaging said abutment, whereby said inner plate will be resiliently mounted with respect to said outer casing and said abutment will prevent said resilient means from passing back through said apertures in said sides of said outer casing.

2. The mounting assembly as claimed in claim 1, wherein said resilient means is a coil spring.

3. the mounting assembly as claimed in claim 1, wherein said means on an outside of said outer casing for anchoring said resilient means is a bar attached to ends of said resilient means.

4. A mounting assembly for mounting an audio play back machine in a vehicle comprising:

an outer casing having a bottom and four sides, means on said bottom for mounting said outer casing to a vehicle, a plurality of first apertures in said sides of said outer casing, an inner plate having a bottom surface, a top surface and four sides, a plurality of second apertures extending through said top and bottom surfaces of said inner plate, resilient means attached to each of said second apertures, each of said resilient means extending through one of said first apertures in said sides of said outer casing, elongated bar means on an outside of said outer casing for anchoring said resilient means, wherein said apertures in said sides of said outer casing are T-shaped, whereby said inner plate will be resiliently mounted with respect to said outer casing.

\* \* \* \* \*